United States Patent [19]

Tomczuk et al.

[11] Patent Number: 5,356,605
[45] Date of Patent: Oct. 18, 1994

[54] RECOVERY OF $UO_2/PU\ O_2$ IN IFR ELECTROREFINING PROCESS

[75] Inventors: Zygmunt Tomczuk, Lockport; William E. Miller, Naperville, both of Ill.

[73] Assignee: The United States of America as represented by the United States Department of Energy, Washington, D.C.

[21] Appl. No.: 967,652

[22] Filed: Oct. 28, 1992

[51] Int. Cl.⁵ ........................ C01G 56/00; C01G 43/08
[52] U.S. Cl. .................... 423/251; 423/257; 75/397; 75/399; 204/1.5
[58] Field of Search ............... 423/251, 257; 75/396–399; 204/1.5

[56] References Cited

U.S. PATENT DOCUMENTS

| | | | |
|---|---|---|---|
| 2,951,793 | 9/1960 | Hansen | 204/1.5 |
| 3,619,178 | 11/1971 | Felt | 75/397 |
| 4,596,647 | 6/1986 | Miller et al. | 204/212 |
| 4,814,046 | 3/1989 | Johnson et al. | 204/1.5 |
| 5,118,343 | 6/1992 | Coops | 75/396 |
| 5,211,742 | 5/1993 | Amamoto | 75/399 |

*Primary Examiner*—Donald P. Walsh
*Assistant Examiner*—Ngoclan T. Mai
*Attorney, Agent, or Firm*—Timothy L. Harney; Hugh W. Glenn; William R. Moser

[57] ABSTRACT

A process for converting $PuO_2$ and $UO_2$ present in an electrorefiner to the chlorides, by contacting the $PuO_2$ and $UO_2$ with Li metal in the presence of an alkali metal chloride salt substantially free of rare earth and actinide chlorides for a time and at a temperature sufficient to convert the $UO_2$ and $PuO_2$ to metals while converting Li metal to $Li_2O$. $Li_2O$ is removed either by reducing with rare earth metals or by providing an oxygen electrode for transporting $O_2$ out of the electrorefiner and a cathode, and thereafter applying an emf to the electrorefiner electrodes sufficient to cause the $Li_2O$ to disassociate to $O_2$ and Li metal but insufficient to decompose the alkali metal chloride salt. The U and Pu and excess lithium are then converted to chlorides by reaction with $CdCl_2$.

19 Claims, No Drawings

RECOVERY OF UO2/PU O2 IN IFR ELECTROREFINING PROCESS

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

This invention relates to a method for recovering hidden uranium dioxide and plutonium formed in an integrated fast reactor electrorefining process during operation thereof over a period of years.

Electrorefining has been used for years in processes for recovering high purity uranium and plutonium metals from an impure feed of spent nuclear fuel. In the specific case applicable to the invention, the electrorefining is carried out at the same site as the reactor, hence the term "integrated fast reactor or IFR". The electrorefining is performed in an electrolysis cell in which the impure mixture of chopped up fuel elements from the reactor forms the anode, the electrolyte is a fused salt of the metal or metals to be recovered plus an alkali metal halide or mixtures thereof and the purified metal is recovered at the cathode. In some designs, the metal collected at the cathode collects at the bottom of the cell. In general, electrorefining processes have been disclosed in the Hansen U.S. Pat. No. 2,951,793 issued Sep. 6, 1960 and in the Miller et al. U.S. Pat. No. 4,596,647 issued Jun. 24, 1986, the disclosures of which are herein incorporated by reference.

Whether the electrorefining process uses an anode pool of cadmium metal such as disclosed in the Hansen patent or a movable anode basket device as disclosed in the Miller et al. patent or a combination thereof, uranium dioxide and plutonium dioxide form during the operation of the electrorefiner over a period of years, because small amounts of oxygen are inadvertently introduced into the electrorefiner. This results in some of the uranium and plutonium not made available for electrochemical transport and prevents accurate material balances for U and Pu from being measured. In addition, these deposits make it nearly impossible to track nuclear material within the electrorefiner since the precise amount of uranium and plutonium present as oxides cannot be experimentally measured.

SUMMARY OF THE INVENTION

Briefly, the invention is directed to a method of recovering the hidden uranium dioxide and plutonium dioxide values in an electrorefiner after the electrolyte salt has been cleaned of the rare earths and actinides as well as other fission products which inevitably dissolve in the salt during the reprocessing of nuclear fuel. As is well understood during the operation of a nuclear reactor, noble metal fission products such as Mo, Ru, Rh, Pd along with many other products such as the rare earths La, Ce, Pr, Ny, Eu, Gd, Tr, Y, Dy, Er and many others accumulate in either or both of the molten Cd anode or the molten salt and periodically, although not frequently, must be cleaned from the molten Cd anode, if present, and the salt.

During operation of the electrorefiner from time to time, oxygen is introduced into the cell although it is unwanted. When oxygen does enter the electrorefiner, it frequently combines with uranium values and plutonium values present, forming insoluble uranium dioxide and plutonium dioxide which accumulates on the work surfaces of the electrorefiner.

Accordingly, it is an object of this invention to convert the uranium dioxide and plutonium dioxide back to the metals in an electrorefiner without introducing material into the electrorefiner which is foreign to the electrorefining process.

Another object of the invention is to provide a method for recovering uranium dioxide and plutonium dioxide in an electrorefiner at temperatures near 500° C.

These and other objects of the invention are accomplished by contacting plutonium dioxide and uranium dioxide with lithium metal in the absence of rare earth or actinide values.

The invention consists of certain novel features and a combination of parts hereinafter fully described, and particularly pointed out in the appended claims, it being understood that various changes in the details may be made without departing from the spirit, or sacrificing any of the advantages of the present invention.

DETAILED DESCRIPTION OF THE INVENTION

In some IFR's, the recovery vessel of the fuel processing plant contains a pool of cadmium metal overlayed by a fused metal electrolyte consisting of alkali metal chloride particularly the lithium chloride-potassium chloride eutectic with uranium chloride and plutonium chloride dissolved in the salts. During repeated fuel reprocessing various fission products accumulate in the salt such as the rare earth and other actinide chlorides. In addition, various noble metals collect in the cadmium pool. Periodically, both the liquid metal cadmium pool with the noble metal dissolved therein and the contaminated fused salt electrolyte have to be removed from the electrorefiner and purified. Upon reintroduction of a cleaned fused salt electrolyte consisting primarily of the lithium chloride-potassium chloride eutectic, free of the rare earth and actinide chlorides, the recovery of the uranium dioxide and plutonium dioxide formed during the electrorefining process may be accomplished. While various stable chlorides other than the rare earth or actinide metal chlorides may be present, it is imperative for the subject invention that the halide salt, which may be other than the aforementioned lithium chloride-potassium chloride eutectic, be free of the rare earth and actinide metal chlorides. In order to reduce the uranium dioxide and plutonium dioxide to the metal, it is required that an excess amount of lithium metal be added to the salt and upon contact of the lithium metal with the uranium dioxide and plutonium dioxide the following reactions take place:

$$UO_2 + 4Li(s) \rightarrow 2Li_2O(s) + U \quad [1]$$

$$PuO_2 + 4Li(s) \rightarrow 2Li_2O(s) + Pu \quad [2]$$

Both lithium and lithium oxide have some solubility in the salt, but the amount of lithium added to the system is far in excess of the amount necessary to saturate the salt. Uranium dioxide, plutonium dioxide, uranium metal and plutonium metal will precipitate as solids during the reaction. The free energies of formation of the oxides are at 800° K.

$$Li_2O - \Delta G = -117.9 \text{ kcal/mol}$$

$UO_2 - \Delta G = -225.9$ kcal/mol $PuO_2 - \Delta G = -214.9$ kcal/mol

For the reduction of $UO_2$ by lithium:

$$Ke = \frac{a_{Li_2O}}{(a_{Li})^2} = 22.5$$

where Ke is the equilibrium constant for reaction [1]. A higher value for Ke is obtained when $PuO_2$ is reduced.

The high values for Ke's for the reduction reactions indicates that $Li_2O$ should be present in the salt as long as there is lithium metal in the salt which is contacting the $UO_2$-$PuO_2$ wherever it is. Since there is some solubility of $Li_2O$ in the salt, we should be able to extract this oxygen from the salt by some means. Two possible methods, one by chemical reduction, and one by electrochemistry are possible.

Chemical Reduction Method

In order to remove the $Li_2O$ by chemical reaction with rare earth turnings held in the anode basket contacting the ER salt, the reaction is:

$$2Ce + 3Li_2O \rightarrow Ce_2O_3 + 6Li$$

while cerium is used as an example, other rare earths for which the oxides are thermodynamically more stable than $Li_2O$ are acceptable.

At 800° K., the free energy change for the above reaction is $-19.3$ kcal and thus $$Ke = 1.9 \times 10^5 = \frac{(a_{Li})^6}{(a_{Li_2O})^2}$$

Rearranging terms in the above equation and taking cube root leads to $$\frac{a_{Li_2O}}{(a_{Li})^2} = 0.017$$

Since the equilibrium ratio of $Li_2O$ to $Li^2$ is three orders of magnitude lower in the above equation than when $UO_2$ is reduced by lithium, there is a driving force for the transport of oxygen to Ce (held in the anode basket and retrievable after reaction completion).

Electrochemical Method

In order to remove $Li_2O$ by an electrochemical method, the electrode reactions are:

| Anode | Electrolyte | Cathode |
|---|---|---|
| $Li_2O \xrightarrow{-2e} 2Li^{+1} + \frac{1}{2}O_2$ | | $Li^+Cl^- \xrightarrow{+e} Li^0 + Cl^-$ |

The overall cell reaction is $$2Li_2O \rightarrow 4Li^\circ + O_2$$

The emf for this reaction is about 2.6 V. The emf for decomposition of the eutectic salt is 3.35 V at $10^{-3}$ atm partial pressure of chlorine. This voltage difference provides a margin to work with to avoid salt decomposition. An oxygen electrode incorporating a purge gas system to transport the $O_2$ to outside the electrorefiner is required by this method, but such electrodes are known in the art. Lithium saturation of the salt should not cause the cell to short since the resistance of the salt is lowered only about 7% when saturated with lithium metal.

In the process cycle, it is important that certain conditions exist if either method is to work. These conditions include:

1. The salt cannot be in contact with the large cadmium pool, since lithium dissolved in cadmium will not have sufficient activity to cause reduction of $UO_2/PuO_2$.
2. The salt bath cannot contain $ReCl_3$ or actinide chlorides, since these will react with lithium.
3. As shown in the chemical reduction method, rare earth metals should not be present unless they can be withdrawn (as oxides) from the electrorefiner after oxide reduction.

The recovery of the "hideout" material occurs in the process after a modified drawdown procedure. The salt containing rare earths and small amounts of actinides is removed from the electrorefiner and "cleaned" in waste processing as usual to remove the rare earths and actinides. In removing the salt from the ER a small heel should be left on top of the cadmium pool. (This heel and the side walls of the vessel are the probable location of oxide "hideout" insolubles). After the salt is cleaned it is returned to the ER vessel. The cadmium is then pumped from beneath the salt along with some salt in order to minimize the cadmium heel. This pump out preferably is through a coarse filter at the end of the line which is left in place after the cadmium removal until after the next step is completed. The filter will trap (inside the vessel) any mobile solids which were at the original cadmium pool—salt interface or in the Cd phase. This technique creates the situation needed to apply the lithium reduction method.

The Electrolytic Method

An oxygen electrode is added to the system, as is well known and the metal is added and the reduction of the oxide carried out. If the chemical reduction method is used for lithium oxide reduction, a rare earth metal bed in the anode basket effects the $Li_2O$ reduction. After completion of the reaction and withdrawal from the electrorefiner of the oxygen (or oxide), the excess lithium is oxidized by the addition of $CdCl_2$. Enough $CdCl_2$ is added to react with any excess lithium and also converts any uranium-plutonium metal formed during the reduction to $UCl_3$ and $PuCl_3$ which dissolves in the salt. An analysis of the salt measures the amount of "hideout" $UO_2/PuO_2$ recovered.

To get some idea of the quantity of lithium involved we start with the FCF electrorefiner which has a volume of salt of about 250 liters.

The solubility of Li (plus K) in the salt is given as 0.1 mol/liter at 500° C. For the reduction $KCL + (Li)_s \rightarrow LiCl + (K)_s$ we calculate that $$Ke = 0.0776 = \frac{(a_K)_s}{(a_{Li})_s}$$

which says that the activity of K in the salt is one order of magnitude less than the activity of Li. If the activity coefficients of the two metals in the salt are comparable then the ratio of concentrations of the two metals in the salt will be comparable to the activity ratios and we will, therefore, ignore the potassium. At 0.1 mol/liter the saturation concentration of lithium in the salt is then $3.4 \times 10^{-3}$ mol fraction ($4.1 \times 10^{-4}$ weight fraction).

To saturate ~250 liters of salt with lithium we need $0.1 \times 250 = 25$ mols (~173.5 g of Li). The $UO_2$ equivalent of this amount of Li is 1.69 kg (1.49 kg of uranium). The amount of $CdCl_2$ required to oxidize the lithium after the reduction (assuming the salt is saturated at the time) is 2.3 kg. The amount of $CdCl_2$ to form $UCl_3$ from the uranium produced by the lithium reduction is of course 1.15 kg per kilogram of uranium.

It should be pointed out the lithium saturation in the salt is not a required condition, but will be affected by rates and by the level of lithium activity (and associated lithium oxide activity) in the salt.

The advantages of this method are:
1. The $UO_2/PuO_2$ solids which formed somewhere inside the ER vessel would not have to be moved in order to recover the U/Pu. The oxide is reduced wherever contacted in the salt.
2. The $PuO_2/UO_2$ would not have to be recovered from a filter.
3. No "foreign" reducing agents such as Mg or Ca enter into the process.
4. We have a direct way of measuring the effectiveness of the method and could report the amount of "hideout" material recovered for accountancy.

An advantage of using Li/LiCl as a reductant system for TRU-containing materials, is the possibility of operating at lower temperatures (500°–600° C.), where materials problems are not as severe. Thus far, we have conducted five experiments using lithium as a reductant for $UO_2$. Experience has shown that $UO_2$ is more difficult to reduce than the TRU oxides and thus any system which reduces $UO_2$ should readily reduce these oxides also. In all the experiments, we have used 50.0 g of $UO_2$, 250 g of salt, and 10.3 g of lithium (a 100% excess of stoichiometric requirements). The experiments were conducted in MgO crucibles using tantalum stirrers. The variables have been salt composition and temperature. The reduction of $UO_2$ by lithium is thermodynamically more favorable at 800 K (527° C.), $\Delta G° = -9.95$ kcal mol$^{-1}$, than it is at 1100 K (827° C.), $\Delta G = 2.18$ kcal mol$^{-1}$, however, the kinetics are probably not as favorable.

The first two reductions used LiCl-5 wt % LiF salt and differed only in temperature, 775° C. vs. 650° C. The products of each reduction were identical consisting of a absolutely white salt with several beads of lithium on the top surface and a layer of lithium-coated uranium beads on the bottom. Both reductions appeared to be successful.

The third experimentation used LiCl-KCl eutectic salt and was conducted at 650° C. The products differed somewhat from the first two experiments, in that there was an accumulation of dark black salt on the crucible sides above the white salt layer. The black salt was separated from the white salt and had obviously been floating on the top surface during stirring. A significant portion of the excess lithium was embedded in the black salt. Again, a layer of lithium-coated uranium beads, although smaller in size than previous experiments, was on the bottom of the salt layer. X-ray diffraction examination of the black salt showed $Li_2O$ and $\alpha$-uranium in addition to the starting salt. Separation of salt phases suggests that the salt became saturated with $Li_2O$ and the excess precipitated out. Based on density, however, one would have expected the $Li_2O$ to settle to the bottom.

The last two reduction experiments were conducted with LiCl-KCl eutectic salt to which was added 5 wt % LiF and differed only in temperature, 650° C. and 550° C. The products were similar to the previous experiment in that the black accumulation on the crucible walls was present and the lithium-coated uranium beads were on the bottom of the salt. A difference was that there were no lithium beads associated with the black salt layer. In addition to the white salt, the experiment at 550° C. had a grey salt layer between the white salt and bottom layer. X-ray diffraction analysis of both the black and grey salt showed only $Li_2O$ and $\alpha$-uranium in addition to the starting salt. Thus, it is possible that the grey layer is $Li_2O$ which has settled out as one would have expected it to.

We have conducted two more $UO_2$ reduction experiments, both at 500° C. The first used a LiCl-KCl eutectic salt to which was added 5% LIF. 100% excess of lithium was used to effect the reduction of 50.0 g $UO_2$. The experiment was identical to one described last month differing only in temperature. The results were identical to those obtained at 550° C. The other experiment was similar but employed only a 10% excess of lithium and 50% more salt. It was hoped that the additional salt would be able to dissolve all the $Li_2O$. The products differed in appearance from previous runs. There was still a small amount of $Li_2$ attached to the crucible above the white salt, but much reduced from previous experiments. Apparently the solubility of $Li_2$ in LiCl-KCl eutectic is still being exceeded. The excess lithium was found on the top of the salt and not coating the uranium beads as in previous experiments. The black bottom layer of the salt did not appear to have any metal beads in it, however, x-ray diffraction analysis showed the black layer to contain $\alpha$-U, LiCl, and KCl as major phases and LIF and $Li_2O$ as traces. $UO_2$ was possibly present at the trace level. The possible presence of $UO_2$ was disturbing as it implies incomplete reduction. X-ray diffraction detection of $UO_2$ in our system is difficult because the major $UO_2$ line is obscured by a KCl line. An effort was made to separate the black material from the salt using a porous MgO crucible to drain the molten salt away from the insoluble uranium. The salt that drained through the crucible was white. The material remaining in the crucible was black, very porous and firmly attached to the crucible. The weight of this black residue was approximately 50% greater than it should have been if it contained only uranium, presumably the black material retained significant salt. X-ray diffraction analysis of the black material showed $\alpha$-U as the major phase, KCl as a minor phase and $UO_2$ and LiCl as very minor phases. Hence, it appears that the reduction of $UO_2$ was incomplete in this experiment. This finding is consistent with the calculations shown on page 5, line 21, which indicate that the $$\left( \frac{Li_2O}{Li} \right)$$

needs to be below a certain value in order for the reaction of Li and $UO_2$ to continue to completion. Work on the second phase of this program, lithium reductions in LiCl salts, has focused on recycling the lithium which has been oxidized to $Li_2O$. In the IFR electrorefiner, it has been proposed that the precipitated $UO_2+PuO_2$ be reduced with lithium and that the $Li_2O$ be removed from the salt by reaction with rare earth metals contained in the anode basket. The reaction is:

$$3Li_2O + 2RE \rightarrow RE_2O_3 + 6Li$$

which has a free energy of reaction at 800 K of $-19.29$ kcal mol$^{-1}$ when the rare earth (RE) is cerium. To test the feasibility of this technique and regenerating lithium, we took the salt product from a previous lithium reduction experiment and reacted it with excess cerium. The salt was a LiCl-LiF salt which contained approximately 11 g of $Li_2O$. Fifty grams of cerium ($\sim 50\%$ excess) was added to this salt contained in a MgO crucible. The crucible was heated to 650° C. and stirred at 900 rpm for 6 hours before terminating the experiment. The products of reaction consisted of a ball of lithium on the salt surface, a white salt layer, and an orange-yellow salt layer. The color of the bottom salt was unexpected as $Ce_2O_3$ is reported to be greenish. X-ray diffraction analysis of the salt identified only LiCl, LiF and $Ce_2O_3$. Hence, in this salt system, $Ce_2O_3$ must be yellow-orange. The amount of lithium generated was difficult to determine but was at least 4 grams and may have been as high as 5.1 grams, the theoretical amount. There was no excess cerium metal after the reaction, the excess had reacted with the MgO crucible. We had expected some attack to the crucible from the cerium, but the extent of the attack was somewhat surprising. In conclusion, it appears that using rare earths to remove $Li_2O$ from the salt is chemically feasible.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A process for converting $PuO_2$ and $UO_2$ values present in an electrorefiner to Pu and U metals, comprising contacting the $PuO_2$ and $UO_2$ with Li metal in the presence of an alkali metal chloride salt substantially free of rare earth and actinide chlorides for a time and at a temperature sufficient to reduce the $PuO_2$ and $UO_2$ values to the Pu and U metals while converting Li metal to $Li_2O$.

2. The process of claim 1, wherein the alkali metal chloride salt is an eutectic composition of LiCl and KCl.

3. The process of claim 1, wherein the reduction of $UO_2$ and $PuO_2$ with Li metal takes place at a temperature less than about 600° C.

4. The process of claim 1, wherein the reduction of $UO_2$ and $PuO_2$ with Li metal takes place at a temperature in the range of from about 500° C. to about 600° C.

5. The process of claim 1, wherein the U and Pu metals are later oxidized with $CdCl_2$ to form $UCl_3$ and $PuCl_3$, and to dissolve such chlorides in the alkali metal chloride salt.

6. The process of claim 1, wherein the electrorefiner is substantially free of Cd metal during the reduction of $UO_2$ and $PuO_2$ with Li metal.

7. The process of claim 1, wherein sufficient Li metal is present to saturate the alkali metal chloride salt after the reduction of $UO_2$ and $PuO_2$ is complete.

8. The process of claim 7, wherein any unreacted Li metal is oxidized by contacting same with $CdCl_2$ after the reduction of $UO_2$ and $PuO_2$.

9. A process for converting $PuO_2$ and $UO_2$ values present in an electrorefiner to $PuCl_3$ and $UCl_3$, comprising contacting the $PuO_2$ and $UO_2$ with Li metal in the presence of an alkali metal chloride salt substantially free of rare earth and actinide chlorides for a time and at a temperature sufficient to reduce the $PuO_2$ and $UO_2$ values to Pu and U metals while converting Li metal to $LiO_2$, contacting the $LiO_2$ values with rare earth metals to reduce the $LiO_2$ to Li metal while forming rare earth oxides, physically separating the rare earth oxides from the alkali metal chloride salt, and converting the U and Pu metals to $PuCl_3$ and $UCl_3$ by reaction with $CdCl_2$.

10. The process of claim 9, wherein the reduction of $UO_2$ and $PuO_2$ takes place at a temperature not greater than about 600° C.

11. The process of claim 9, wherein the reduction of $UO_2$ and $PuO_2$ takes place at a temperature of about 500° C.

12. The process of claim 9, wherein the reduction of $UO_2$ and $PuO_2$ takes place in an environment substantially free of Cd.

13. The process of claim 9, wherein the rare earth metals are placed in a movable anode basket and introduced into the alkali metal chloride salt containing the $Li_2O$ and the anode basket is removed after the $Li_2O$ is reduced to Li metal and rare earth metal oxides are formed.

14. The process of claim 9, wherein the rare earths include Ce.

15. A process for converting $PuO_2$ and $UO_2$ values present in an electrorefiner to the chlorides, comprising contacting the $PuO_2$ and $UO_2$ with Li metal in the presence of an alkali metal chloride salt substantially free of rare earth and actinide chlorides for a time and at a temperature sufficient to convert the $UO_2$ and $PuO_2$ to metals while converting Li metal to $Li_2O$, providing an oxygen electrode for transporting $O_2$ out of the electrorefiner and a cathode, applying an emf to the electrorefiner electrodes sufficient to cause the $Li_2O$ to decompose to $O_2$ and Li metal but insufficient to decompose the alkali metal chloride salt to remove $O_2$ from the electrorefiner environment leaving U and Pu and Li metal and converting the U and Pu to chlorides by reaction with $CdCl_2$.

16. The process of claim 15, wherein the emf is less than about 3.35 volts at $10^{-3}$ atm partial pressure of chlorine.

17. The process of claim 15, wherein the emf is in the range of from about 2.6 volts to about 3.35 volts at $10^{-3}$ atm partial pressure chlorine.

18. The process of claim 15, wherein sufficient Li metal is added to the alkali metal halide salt to saturate same.

19. The process of claim 18, wherein unreacted Li metal along with U and Pu metals are oxidized with $CdCl_2$ to form the chlorides.

* * * * *